US011623705B2

(12) United States Patent
Espinosa Fernandez et al.

(10) Patent No.: US 11,623,705 B2
(45) Date of Patent: Apr. 11, 2023

(54) BOX TO CAB ALIGNMENT VERIFICATION GAUGE AND SYSTEM

(71) Applicants: Rodrigo Espinosa Fernandez, Mexico City (MX); Alberto Quitze Ponce Soto, Mexico City (MX); Bertha Karen Sanchez de la Concha, Ecatepac de Morelos (MX)

(72) Inventors: Rodrigo Espinosa Fernandez, Mexico City (MX); Alberto Quitze Ponce Soto, Mexico City (MX); Bertha Karen Sanchez de la Concha, Ecatepac de Morelos (MX)

(73) Assignee: FCA US LLC, Auburn Hills, MI (US)

( * ) Notice: Subject to any disclaimer, the term of this patent is extended or adjusted under 35 U.S.C. 154(b) by 204 days.

(21) Appl. No.: 17/218,510

(22) Filed: Mar. 31, 2021

(65) Prior Publication Data
US 2022/0315140 A1 Oct. 6, 2022

(51) Int. Cl.
*B62D 65/02* (2006.01)
*B62D 65/16* (2006.01)

(52) U.S. Cl.
CPC ........... *B62D 65/028* (2013.01); *B62D 65/16* (2013.01)

(58) Field of Classification Search
CPC .............................. B62D 65/028; B62D 65/16
See application file for complete search history.

(56) References Cited

U.S. PATENT DOCUMENTS 7,062,828 B2 * 6/2006 McKnight .............. B62D 33/02
29/252
7,578,066 B1 * 8/2009 Pellegrino .............. G01B 5/255
248/220.21

* cited by examiner

Primary Examiner — Jason L Vaughan
Assistant Examiner — Amanda Kreiling
(74) Attorney, Agent, or Firm — Ralph E. Smith

(57) ABSTRACT

A system and method for determining alignment of a first part relative to a second part includes an alignment gauge body including a first portion for resting against the first part and a second portion for positioning juxtaposed to the second part and a measuring device fixedly coupled to the alignment gauge body. The measuring device generates a distance signal corresponding to a distance between a first face of the first part and the second face of the second part. A controller coupled to the gauge device and a memory. The controller is programmed to store a vehicle identification number (VIN) in the memory and compare the distance. The controller associates the VIN and the distance in the memory. The controller compares the distance to a threshold and setting a flag in response to comparing. A display coupled to the controller displays an indicator corresponding to the flag.

19 Claims, 5 Drawing Sheets

BOX TO CAB ALIGNMENT VERIFICATION GAUGE AND SYSTEM

FIELD

The present disclosure relates generally to an alignment tool and, more particularly, to an alignment tool for positioning a component such as a cargo box with a second component such as a cab of a vehicle.

BACKGROUND

Trucks such as pickup trucks are typically body-on-frame construction where a cab and a box or cargo bed are separate components that are mounted to a frame. A well-known issue with building a truck is the alignment of the cargo box relative to the cab of the truck. Efforts to control misalignment include using a mechanical alignment tool such as a template for determining whether misalignment has occurred. Using a manual tool fails to account for the misalignment unless some is keeping track. That is, if an inspector fails to report the misalignment, the product may leave the facility and require later adjustment. Adjustment at the dealer is a rather costly undertaking and therefore it is desired to avoid such repairs.

SUMMARY

The present disclosure allows accounting for a misalignment using the vehicle identification number. When the vehicle identification number and a misalignment status flag is set, the plant or dealer systems will allow the vehicle to remain flagged or held until the alignment of flushness of the components is determined. Advantageously, the historical data of the measurements, reprocessing along with the vehicle identification number is stored for future reference.

In a further aspect of the disclosure, a system for determining alignment of a first part relative to a second part includes an alignment gauge body including a first portion for resting against the first part and a second portion for positioning juxtaposed to the second part and a measuring device fixedly coupled to the alignment gauge body. The measuring device generates a distance signal corresponding to a distance between a first face of the first part and a second face of the second part. A controller coupled to the gauge device and a memory. The controller is programmed to store a vehicle identification number (VIN) in the memory and compare the distance. The controller associates the VIN and the distance in the memory. The controller compares the distance to a threshold and setting a flag in response to comparing. A display coupled to the controller displays an indicator corresponding to the flag.

In another aspect of the disclosure, method of measuring flushness of a first part and a second part includes storing a VIN from a VIN signal in a memory of a test monitoring computer, generating a distance signal corresponding to a distance between a first face of the first part and a second face of the second part using a measuring device and comparing the distance signal to a threshold and generating a flag corresponding to the first face and the second face being non-flush.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Example embodiments will now be described more fully with reference to the accompanying drawings.

Figure 1:
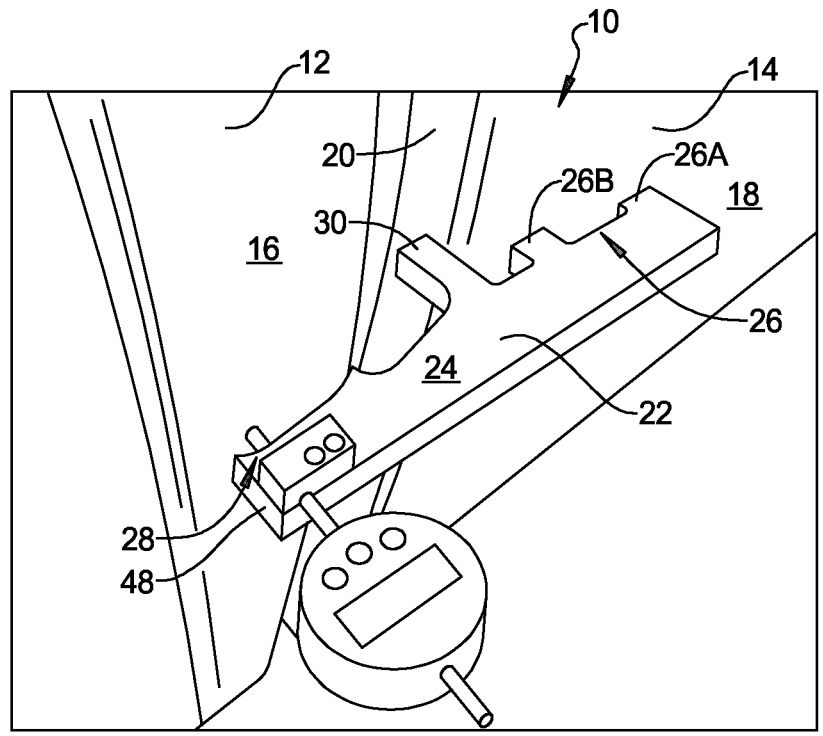
FIG. 1 is a perspective view of the alignment gauge juxtaposed to two components.

Referring now to FIG. 1, a vehicle 10, such as pickup truck or the like, has two parts or components such as a cab 12 and a bed 14 that are supposed to be aligned or flush with each other. The cab 12 and bed 14 are examples of body parts of body panels that are intended to be flush. The system measures the relative position of two components. Aligned or flush is one determination. However, the system can be used for components designed to be offset as well. That is, the system measures the relative position of two components and compares the relative position to a designed position.

The cab 12 has an outer surface 16. The bed 14 has an outer surface 18. The outer surfaces 16, 18, in a perfect example, are flush or nearly flush. The bed 14, as illustrated, has a front-facing surface.

Figure 2:
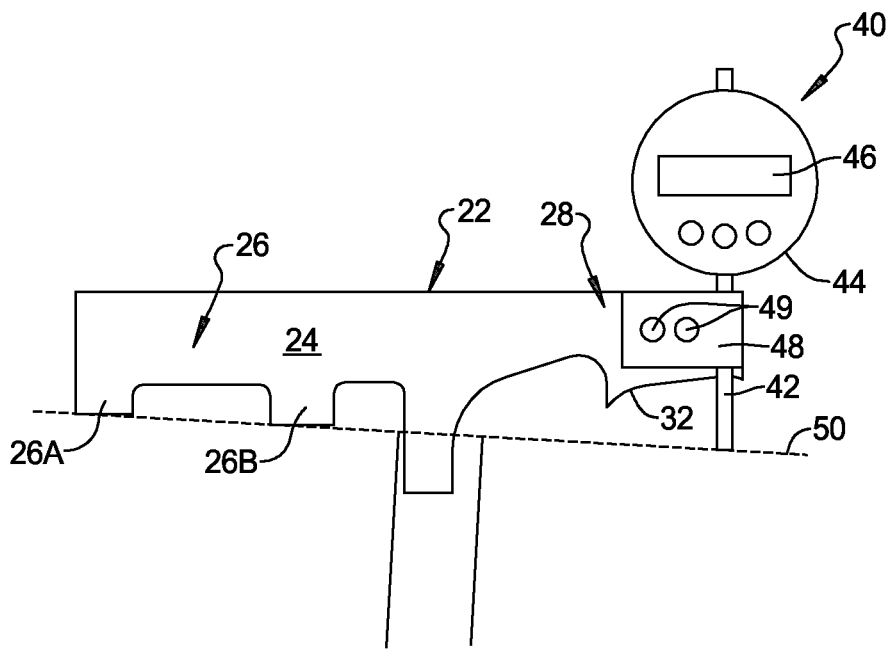
FIG. 2 is a top elevational view of the alignment gauge.

Referring now also to FIG. 2, an alignment gauge body 22 has an elongated portion 24. The length of the elongated portion 24 is such that a first portion 26 and a first end can be positioned against the bed 14 and a second portion 28 at a second end can be juxtaposed to the outer surface 16 of the cab 12. The first portion 26 has extensions 26A, 26B that extend outward from the elongated portion 28 and rest against the outer surface 18 of the bed 14. The alignment gauge body 22 is positioned longitudinally relative to the vehicle by a guide 30. In this example, the guide 30 extends to a position between the cab 12 and the bed 14. In particular, the guide 30 rests against a forward facing surface 20 of the bed 14 when the alignment gauge body 22 is used for measurement.

The second portion 28 has a guide surface 32. The guide surface 32 is juxtaposed to the outer surface 16 of the cab 12, in this example. The guide surface 32, in order for the cab 12 to be aligned with the bed 14 or flush with the bed 14, is spaced a predetermined distance apart. Thus, the distance between the guide surface 32 and the outer surface 16 indicates the flushness of the two components. The guide surface 32, the guide 30 and the extensions 26A, 26B may extend from the elongated portion 24 various amounts depending upon the overall shape of the components for which the flushness is being measured.

A measuring device 40 is disposed at the second portion 28. The measuring device 40 includes an arm 42 that extends and retracts into the measuring device body 44 as it is pushed by the component being measured for flushness. The measuring device may be fasten to or affixed to the second portion. As illustrated, a strap 48 or another securing device may be used to hold the measuring device 40 to the body 44. In this example, the strap 48 is coupled to the measuring device body 44 with fasteners 49.

In FIG. 2, a nominal flush line 50 is illustrated. The arm 42 and the ends of the extensions 26A, 26B are all on the same line or plane. The measuring device 40 displays on the display 46 the deviation or distance from the flush line 50. In the present example, the display 46 is a digitally display that displays the distance measured by the measuring device 40. The display 46 may also be a dial gauge.

Figure 3:
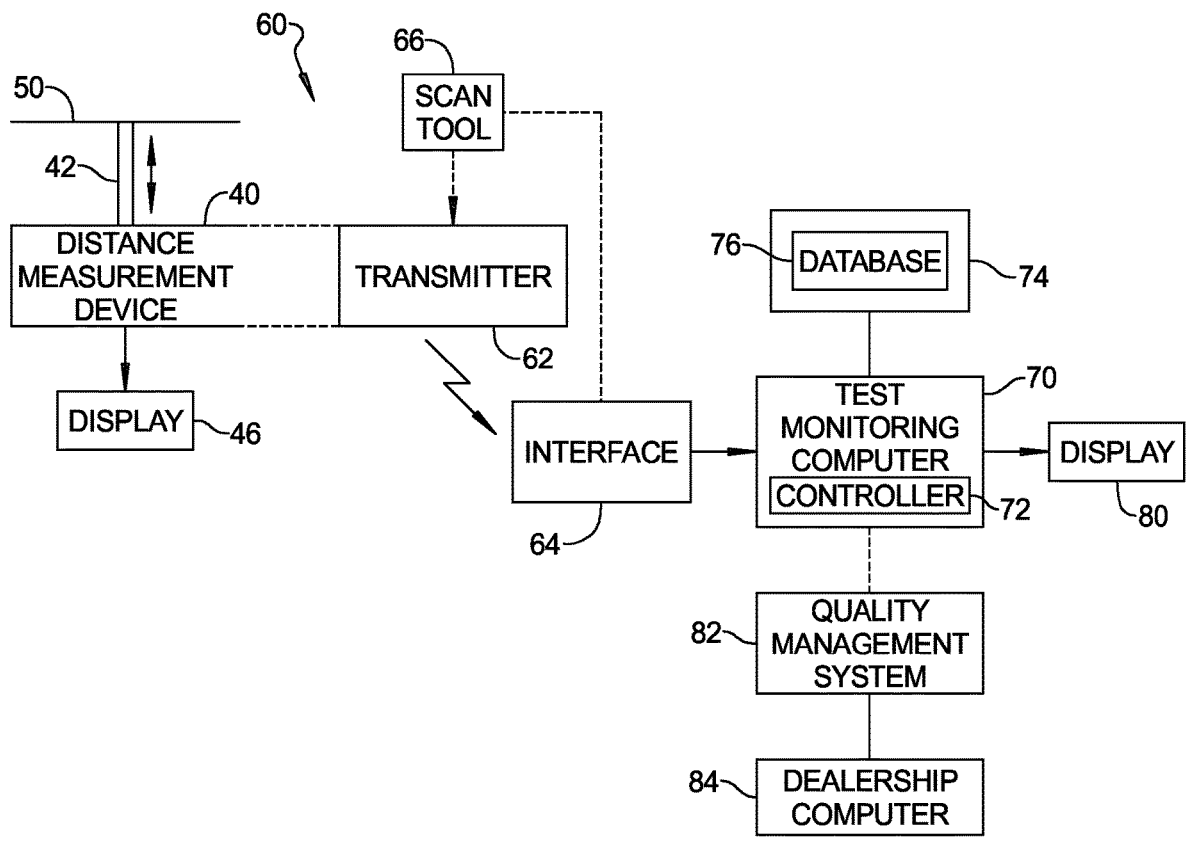
FIG. 3 is a block diagrammatic view of a system according to the disclosure.

Referring now to FIG. 3, a system for determining alignment of a first part relative to a second part is set forth. In this example, the alignment gauge body 22 has been removed.

The distance measuring device 40 has a transmitter 62 associated therewith. The transmitter 62 in this example is incorporated into the distance measuring device 40. The transmitter 62 may be a wired or wireless transmitter. However, the transmitter 62 may be a separate component. The transmitter 62 may be wirelessly or in a wired manner communicates the distance signal from the measuring device through an interface 64.

A scan tool 66 is used for scanning the vehicle identification number (VIN) of the vehicle. The scan tool 66 may incorporate a transmitter therein. However, the scan tool 66 may also be in communication with a separate transmitter such as the transmitter 62 that communicates with the interface 64. The interface may be a wireless interface or a wired interface such as a USB interface. In this example, the scan tool 66 has a USB connector for coupling to the interface 64.

The interface 64 is in communication with a test monitoring computer 70 that has controller 72. The test monitoring computer 70 is in communication with a memory 74, a portion of which may be arranged in a database 76. The test monitoring computer 70 may also store the time of certain events such as passing a test, failing the test and reprocessing the assembly.

A test monitoring computer 70 has a display 80. The display 80 is used for displaying various types of data including a vehicle identification number that is communicated from the scan tool 66 to the test monitoring computer 70 and the status of the flushness of various components. The display 80 may be used for displaying a flag or other types of indicators for performing the test and indicating the vehicle has passed or not passed various inspection criteria.

The test monitoring computer 70 may be coupled to a quality management system 82. The quality management system 82 is used for coordinating the vehicles of the system and generating reports for management. The quality management system 82 may also be in communication with a dealer system 84. The dealer system 84 may also report various alignment issues with various vehicles as indicated by the vehicle identification number and measurements from a distance measuring device that is disposed within the dealership.

Figure 4:
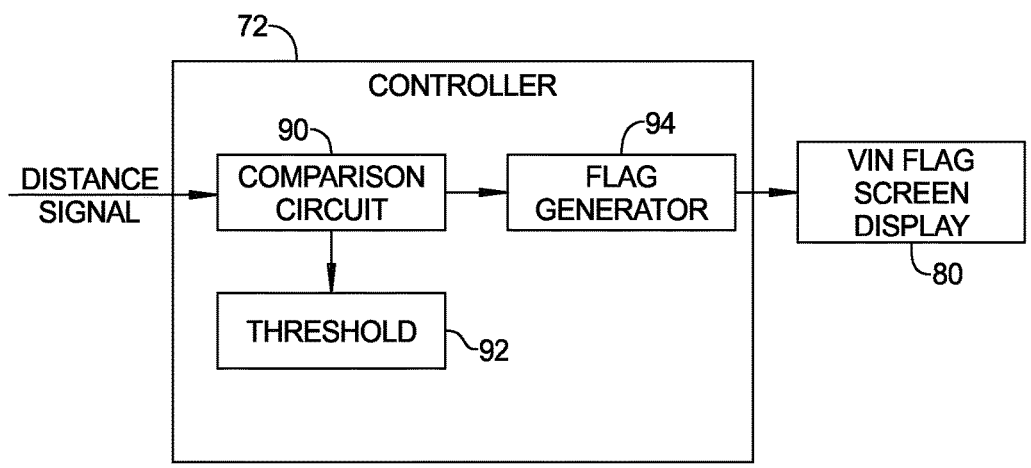
FIG. 4 is a high level block diagrammatic view of the controller of FIG. 3.

Referring now to FIG. 4, the controller 72 is illustrated in further detail. The controller 72 may include a comparison circuit 90 that receives the distance signal from the transmitter 62. The comparison circuit 90 also receives a threshold signal from a threshold memory 92. The threshold memory 92 may be part of the memory 74. The comparison circuit 90 compares the distance corresponding to the distance signal to the threshold or thresholds 92 stored in the memory 74 and a flag generator 94 generates a flag when the two components are not flush based on the distance signal. Examples of not flush are the front of the bed too left or too right relative to the cab. When viewed from the front of the vehicle, the bed may extend outward beyond the side profile of the cab or the front portion of the bed may be behind the cab.

The display 80 may be used to display various items such as the vehicle identification number (VIN), a flag, instructions, the status of the vehicle relative to testing or other types of displays as described in further detail below.

Figure 5:
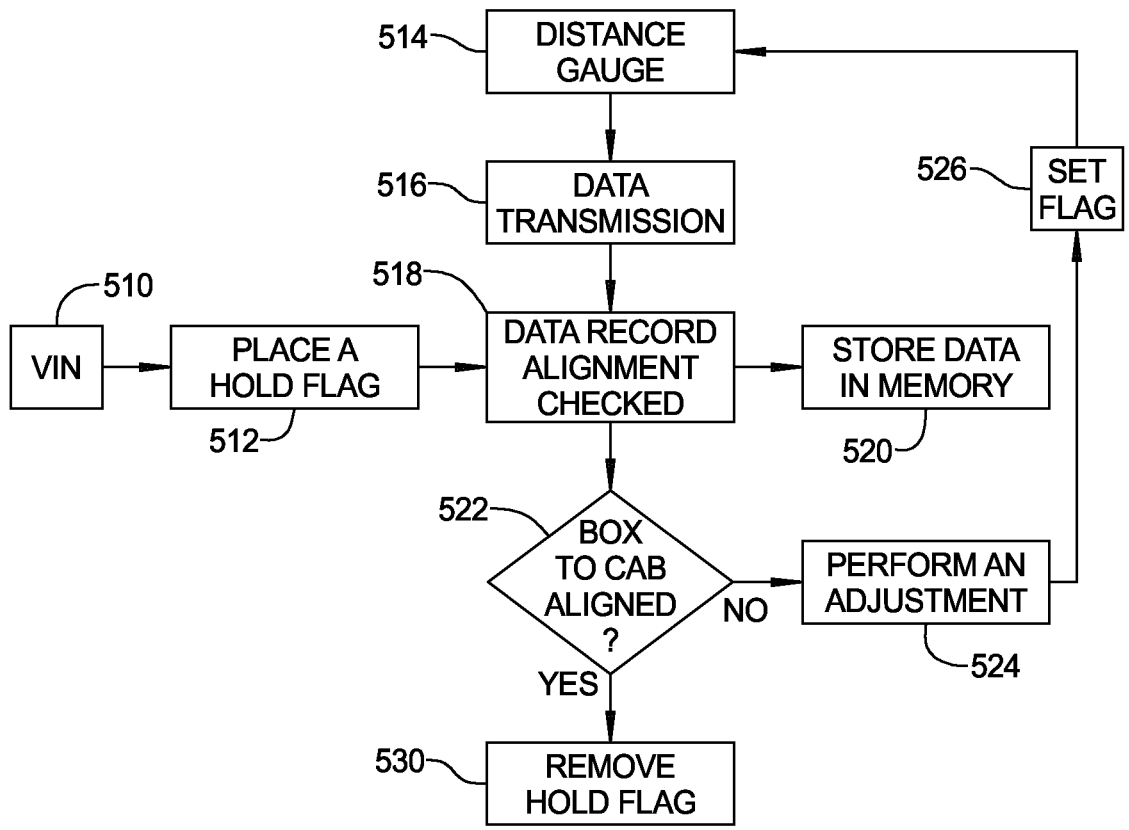
FIG. 5 is a flowchart of a method for operating the system.

Referring now to FIG. 5, a method for operating the system is set forth. In this example, the vehicle identification number is communicated to the system in step 510. A hold flag is generated in step 512.

In step 514, the gauge that measures the distance in step 514 transmits data either wired or wirelessly at step 516 to the system. In step 518, the data is recorded and the alignment is checked in step 518. Step 518 is performed after step 512. The data corresponding to the distance is stored within the memory in step 520.

Referring now to step 518, the data is used within the comparison circuit 90 in FIG. 4 to determine whether the two components, such as the box and the cab in this example, are positioned according to the design such as aligned or flush in step 522. When the box and cab are not aligned, an adjustment be performed in step 524 and a flag indicating that the components are not flush or aligned is generated in step 526.

Referring back to step 522, when the box and the cab are aligned, the flag hold is removed or cleared in step 530.

Figure 6:
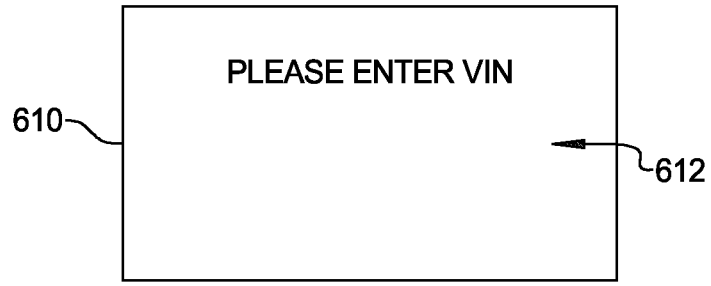
FIG. 6 is a screen display for starting the system.

Referring now to FIG. 6, a screen display 610 generating a command for entering a vehicle identification number is set forth. One example of a screen display is "please enter the vehicle identification number (VIN)". The message 612 may start the process.

Figure 7:
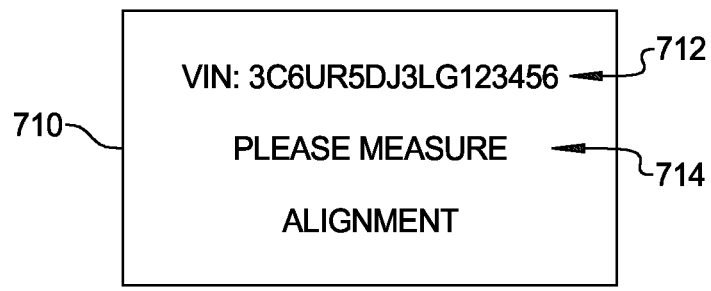
FIG. 7 is a screen display for initiating the process after the vehicle identification number is stored.

Referring now to FIG. 7, a screen display 710 displayed on the display 80 may start the process and display the vehicle identification number at the message 712. An instruction message 714 instructs the user to "please measure the alignment".

Figure 8:
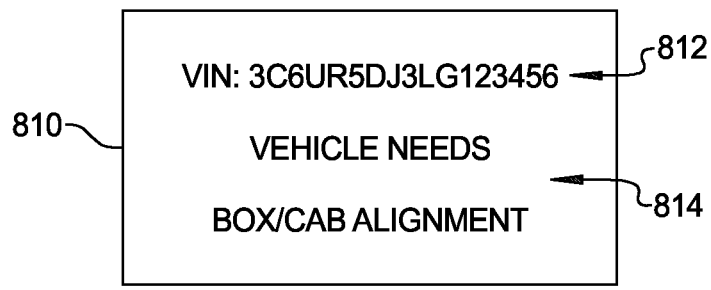
FIG. 8 is a screen display for displaying a warning message should the vehicle be rescanned.

Referring now to FIG. 8, a screen display 810 is used to generate a vehicle identification message 812 and an instruction message that is generated after an unsuccessful alignment or flushness is determined. In this example, the message is "vehicle needs box/cab alignment". Of course, other examples can be used.

Figure 9:
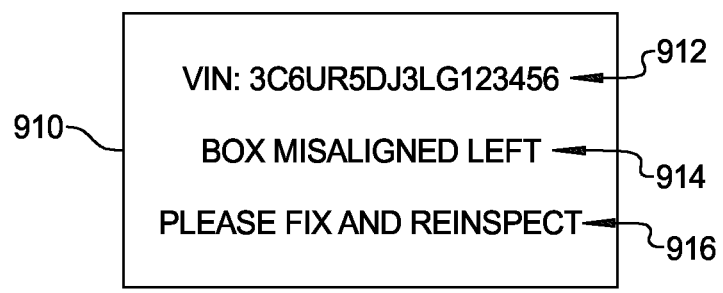
FIG. 9 is a screen display illustrating a warning message for realigning the box and cab.

Referring now to FIG. 9, a screen display 910 for displaying a vehicle identification number message 912 and an instruction message that the box is misaligned. An instruction message 916 may indicate to the user an instruction such as "please fix and re-inspect". During this process, a flag may be set in step 526. In a manufacturing assembly environment, the vehicle in question will not be released from final inspection when a flag has been set. In a dealer environment, the vehicle should not be released to the customer when the flag is set.

Figure 10:
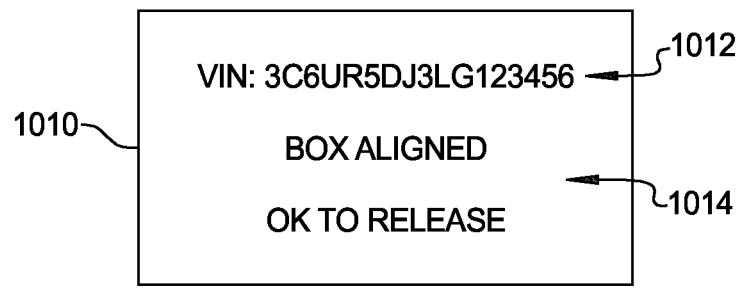
FIG. 10 is a screen display displaying an inspection past message.

Referring now to FIG. 10, a screen display 1010 is illustrated with a vehicle identification message 1012. An inspection past message 1014 may be generated when the box has been realigned and passes inspection or it passes inspection the first time through the process. In this example, the message is "box aligned, okay to release."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for determining alignment of a first part relative to a second part comprising:
    an alignment gauge body comprising a first portion for resting against the first part and a second portion for positioning juxtaposed to the second part and a measuring device fixedly coupled to the alignment gauge body, said measuring device generating a distance signal corresponding to a distance between a first face of the first part and a second face of the second part;
    a memory;
    a controller coupled to the alignment gauge body and the memory, said controller programmed to store a vehicle identification number (VIN) in the memory, associate the VIN and the distance in the memory, compare the distance to a threshold and set a flag in response to comparing; and
    a display coupled to the controller displaying an indicator corresponding to the flag.

2. The system of claim 1 wherein the display displays the distance.

3. The system of claim 2 wherein the display comprises a digital display.

4. The system of claim 1 further comprising a scan tool communicating the VIN to the controller.

5. The system of claim 4 wherein the scan tool is coupled to the controller through an interface.

6. The system of claim 5 wherein the interface comprises a USB interface.

7. The system of claim 5 wherein the interface comprises a wireless interface.

8. The system of claim 1 wherein the first portion comprising a guide disposed against the first part.

9. The system of claim 1 wherein the first part comprises a bed of a truck and the second part comprises a cab of the truck.

10. The system of claim 1 wherein the memory stores the flag associated with the VIN.

11. The system of claim 1 wherein the memory comprises a database storing the flag and the distance associated with the VIN.

12. A method of measuring flushness of a first part and a second part comprising:
    storing a VIN from a VIN signal in a memory of a test monitoring computer;
    generating a distance signal corresponding to a distance between a first face of the first part and a second face of the second part using a measuring device;
    comparing the distance signal to a threshold; and
    generating a flag corresponding to the first face and the second face being non-flush.

13. The method of measuring flushness of claim 12 wherein generating the distance signal comprises generating the distance signal between a first body panel of a vehicle and a second body panel of the vehicle.

14. The method of measuring flushness of claim 13 further comprising generating a screen display indicating flushness.

15. The method of measuring flushness of claim 12 further comprising storing the VIN associated with the flag and the distance in the memory.

16. The method of measuring flushness of claim 12 further comprising storing the VIN associated with the flag and the distance in a database of the memory.

17. The method of measuring flushness of claim 12 further comprising clearing the flag after generating a second distance signal corresponding to a second distance and comparing the second distance to the threshold and comparing corresponds to flushness.

18. The method of measuring flushness of claim 12 wherein generating the distance signal comprises generating the distance signal using an alignment gauge body comprising a first portion for resting against the first part and a second portion for positioning juxtaposed to the second part.

19. The method of measuring flushness of claim 18 wherein generating the distance signal comprises generating the distance signal using the measuring device fixedly coupled to the alignment gauge body, said measuring device generating a distance signal corresponding to a distance between the first face of the first part and the second face of the second part.

* * * * *